April 21, 1959 V. BATTENBERG ET AL 2,883,178
CENTRIFUGALLY RESPONSIVE GOVERNOR VALVE ASSEMBLY
Filed March 9, 1954 3 Sheets-Sheet 1

INVENTORS
Virgil Battenberg
Harold H. Detamore
BY Dale W. Miller
Richard E. Moore Their Attorney

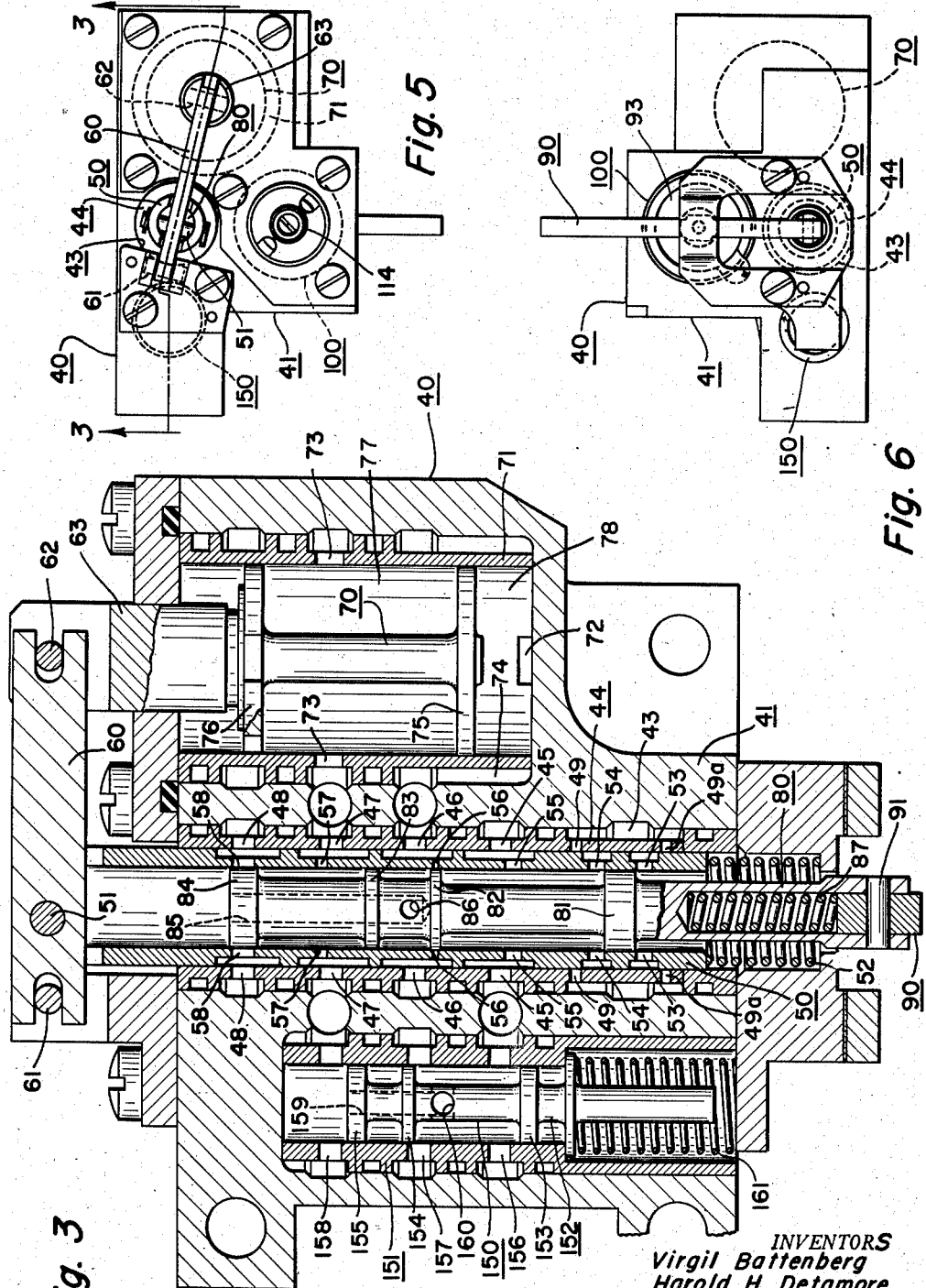

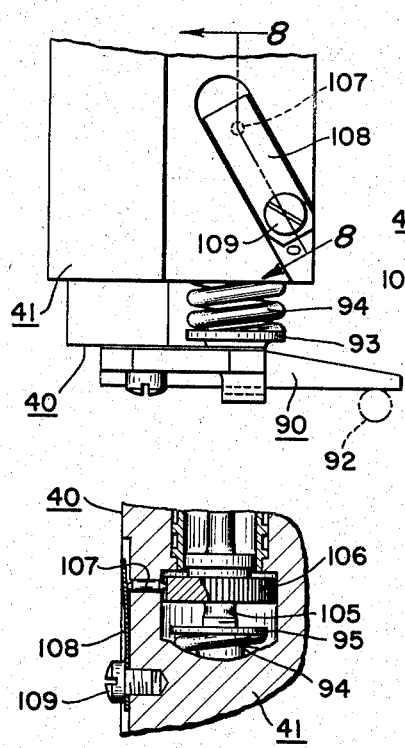
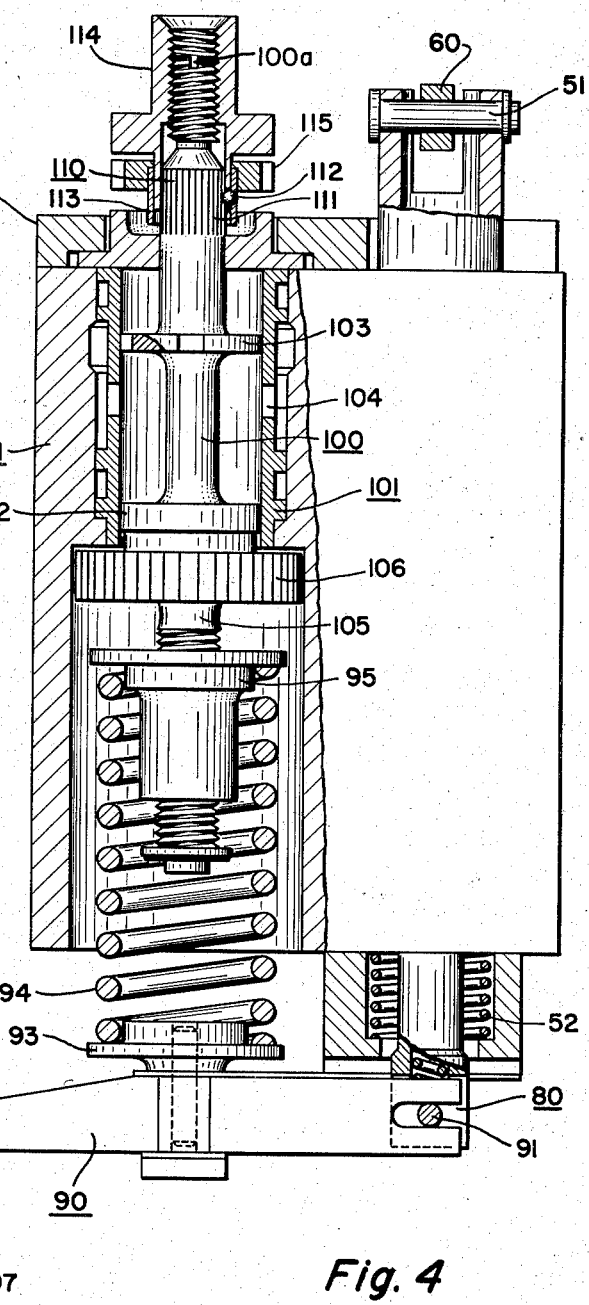

United States Patent Office 2,883,178
Patented Apr. 21, 1959

2,883,178

CENTRIFUGALLY RESPONSIVE GOVERNOR VALVE ASSEMBLY

Virgil Battenberg, Dayton, and Dale W. Miller, Brookville, Ohio, and Harold H. Detamore, Severna Park, Md., and Richard E. Moore, Los Angeles, Calif., assignors to General Motors Corporation, Detroit, Mich., a corporation of Delaware Application March 9, 1954, Serial No. 415,142

4 Claims. (Cl. 267—1)

This invention pertains to a valve assembly, and particularly to a governor valve assembly adapted for use in a centrifugal field.

Heretofore, governing apparatus of the type employing speed responsive valves for controlling the flow of fluid under pressure to servo-motors operatively connected to the speed controlling means of a prime mover, has been extensively used in conjunction with constant speed variable pitch propellers. However, the majority of prior art devices are only speed sensitive, whereas present day propeller pitch control systems require governors to be acceleration and speed sensitive. Accordingly, among our objects are the provision of a governor valve assembly including means sensitive to both the amount of speed error and the rate of change of speed error; the further provision of a governor valve assembly including means for varying the speed setting thereof; and the still further provision of a governor valve assembly including means for effecting speed synchronization thereof with other like governors.

The aforementioned and other objects are accomplished in the present invention by providing a valve assembly including two relatively movable elements, the position of one element being dependent upon the speed of rotation of the governor valve assembly, and the position of the other element being dependent upon the position of a stabilizer piston. Specifically, the valve assembly comprises a valve housing, or guide, having disposed therein a piston movable by the thrust of centrifugal force, and a follow-up sleeve. The valve piston is pivotally connected to a lever having a variable fulcrum and a variable spring load. The spring load on the lever may be varied by actuation of a servo mechanism, and the fulcrum of the lever may be displaced mechanically. The valve assembly also includes a stabilizer cylinder having disposed therein a reciprocable piston. The stabilizer piston is operatively connected to the valve sleeve to effect followup movement thereof upon valve piston movement, whereby fluid flow from the valve assembly is speed and acceleration responsive.

Further objects and advantages of the present invention will be apparent from the following description, reference being had to the accompanying drawings wherein a preferred embodiment of the present invention is clearly shown, and wherein like parts are denoted by like numerals throughout the several views.

In the drawings:

Fig. 3 is an enlarged sectional view of the valve assembly taken along line 3—3 of Fig. 5.

Fig. 4 is an enlarged view, partly in section and partly in elevation, of the valve assembly.

Figs. 5 and 6 are top and bottom end views, respectively, in elevation, of the valve assembly.

Fig. 7 is a fragmentary view, in elevation, illustrating the mechanical spring adjustment for the lever.

Fig. 8 is a fragmentary sectional view taken along line 8—8 of Fig. 7.

Figure 1:
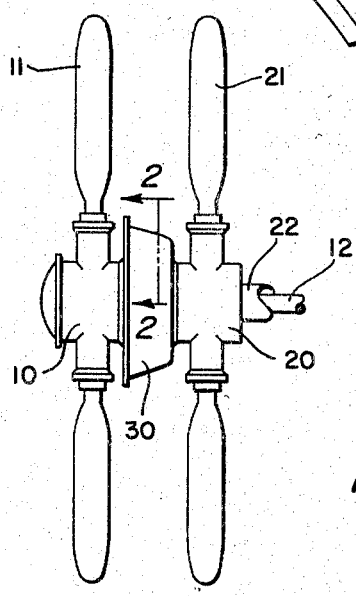
Fig. 1 is a fragmentary view, in elevation, of a variable pitch propeller assembly employing the governor valve assembly of this invention.

With particular reference to Fig. 1, a variable pitch propeller assembly is shown including a pair of axially spaced hubs 10 and 20, each hub having a plurality of radially extending sockets within which propeller blades 11 and 21 are journaled for rotation about their longitudinal axes. Disposed between the propeller hubs and having parts rotatable with each hub, is a unitary regulator assembly 30, the regulator assembly having disposed therein a pair of fluid pressure systems and control units for actuating servo-motors mounted in the hubs so as to effect adjustment of the pitch position of the blades 11 and 21. The hubs 10 and 20 are operatively connected to oppositely rotatable coaxial shafts 12 and 22, the propeller assembly being of the type disclosed and claimed in copending application, Serial No. 404,346, filed January 15, 1954, in the name of Harold H. Detamore, et al. Moreover, the fluid pressure systems disposed within a unitary regulator assembly 30 are of the type disclosed and claimed in copending application, Serial No. 402,440, filed January 6, 1954, in the name of Harold H. Detamore, et al., of which the governor valve assembly of this invention forms a part.

Figure 2:
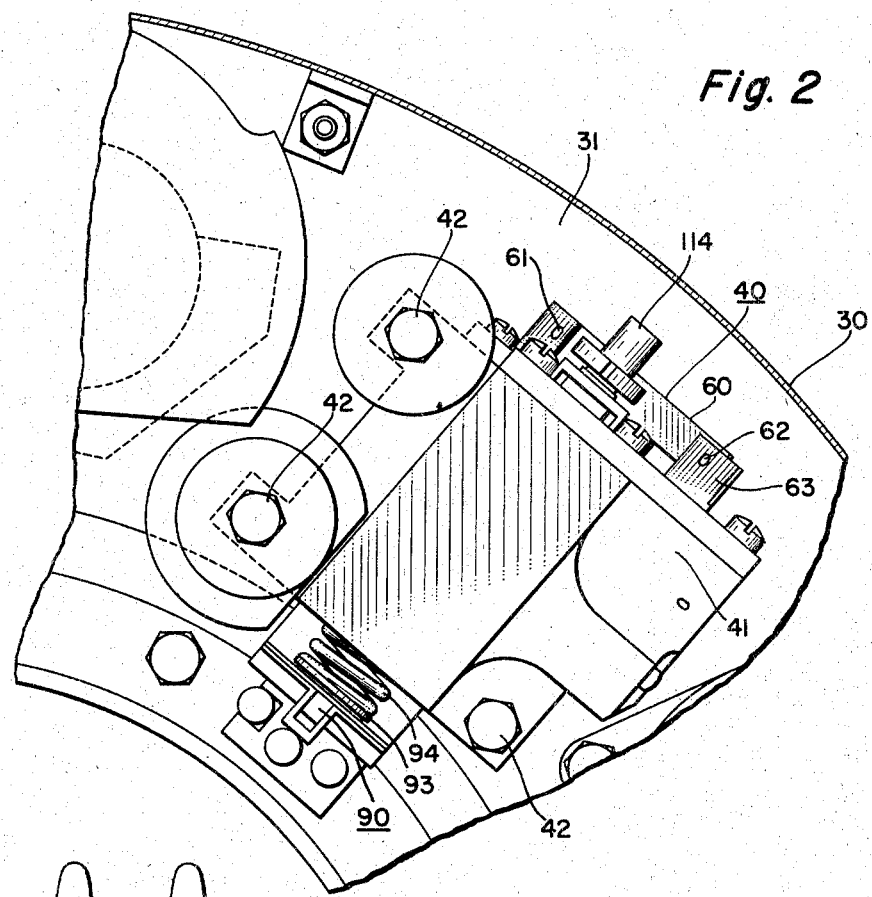
Fig. 2 is an enlarged fragmentary view taken along line 2—2 of Fig. 1.

With particular reference to Figure 2, it may be seen that the unitary regulator assembly 30 includes a mounting plate 31 having attached thereto various component parts of the fluid pressure system. The governor valve assembly of this invention is designated by the numeral 40 in Figure 2, from which it may be seen that the axial centerline thereof is along a radius of the regulator assembly so that the thrust of centrifugal force is operable to effect movement of a valve element in a manner to be described. The valve assembly 40 includes a housing 41, which is attached to the plate 31 by any suitable means such as bolts 42.

With particular reference to Figures 3 to 6, the housing, or valve guide, 41 is provided with a through bore. A porting sleeve 44 is securely fastened within the through bore 43, the porting sleeve including longitudinally spaced sets of circumferential ports 45, 46, 47, 48, 49 and 49a. A valve sleeve 50 is disposed within the porting sleeve 44, and mounted for linear movement relative thereto. As is seen particularly in Fig. 3, one end of the valve sleeve 50 is connected by means of a cross pin 51 to a lever 60. One end of the lever 60 is pivotally supported by a pin 61 on a stationary portion of the valve housing 41, and the other end of the lever 60 is pivotally connected by means of a pin 62 to a rod 63 of a stabilizer piston 70. The sleeve 50 is urged upwardly, as is viewed in Fig. 3, by means of a compression spring 52. The sleeve 50 includes longitudinally spaced, sets of circumferentially spaced ports 53, 54, 55, 56, 57 and 58, and the open ends of the sleeve 50 function as drain connections.

A valve piston 80 is disposed within the valve sleeve 50 and mounted for linear movement relative thereto. The valve piston 80 has formed thereon a series of axially spaced lands 81, 82, 83 and 84. Land 81 cooperates with valve sleeve ports 53 and 54, land 82 cooperates with valve sleeve ports 56 and land 84 cooperates with valve sleeve ports 58. The piston 80 is also formed with an axially extending opening 85, which communicates with a cross passage 86 that opens into the annular channel between lands 82 and 83.

The lower end of the piston 80, as viewed in Fig. 3, is pivotally connected by means of a cross pin 91 to a lever 90. The end of the valve piston 80 adjacent the lever 90 is recessed, and within the recess is disposed a compression spring 87. As is shown more particularly in Figs. 4 and 6, the piston 80 is pivotally connected to one end of the lever 90, the other end of lever 90 having engagement with a movable roller 92. The intermediate point of the lever 90 has attached thereto a spring seat 93, which is engaged by one end of a coiled compression spring 94, the other end of which is engaged by a combined spring seat and guide 95. The spring seat 95 is attached to a servo piston 100, the function of which will be described hereinafter, and suffice it here to say that movements of the servo piston 100 vary the load of spring 94 on the lever 90.

The valve housing 41 also contains a pressure reducer valve designated generally by the numeral 150. The pressure reducing valve 150 forms no part of this invention, except as it forms an integral part of the valve assembly. Briefly, the pressure reducer valve comprises a ported cylinder, or sleeve, 151 having disposed therein a spring loaded piston 152. The piston 152 has a plurality of spaced lands 153, 154 and 155, which cooperate with ports 156, 157, and 158 of the sleeve 151. The piston 152 also includes an axial passage 159, which communicates with a cross passage 160 that opens into the annular channel between lands 153 and 154. High pressure fluid is admitted through ports 157, the ports 158 being connected to port 47 of the governor valve assembly, and ports 156 being connected to ports 45 thereof. The pressure reducer valve assembly 150 maintains a substantially constant pressure of 200 p.s.i. at the ports 158, which pressure opposes the force of spring 161. The constant pressure of 200 p.s.i. is also maintained in the annular channel between lands 153 and 154 which communicates with the space above land 155 through passages 160 and 159. This low pressure in ports 156 communicates with ports 45 in the porting sleeve 44, ports 55 in the valve sleeve 50 and the annular groove between lands 81 and 82 of the valve piston 80. As the pressure at ports 158 exceeds 200 p.s.i., the piston 152 will be forced downwardly, as viewed in Fig. 3, so as to throttle the inlet ports 157.

The stabilizer piston 70 is disposed within a stabilizer cylinder 71. The stabilizer cylinder 71 is provided with port openings 72 and 73, port opening 72 communicating with a chamber 74 of the valve housing 41, which chamber communicates with port openings 46 of the porting sleeve 44. Port opening 73 communicates with ports 47 of the porting sleeve 44. The piston 70 is formed with a working surface 75 and a ported land surface 76, having connection with the rod 63. As is apparent from an inspection of Fig. 3, the rod end chamber 77 of the stabilized cylinder is always in communication with port 47 of the porting sleeve 44, which is, in turn, always in communication with the constant low pressure fluid from the pressure reducer valve 150. Thus, the rod end of surface 76 is always exposed to a substantially constant pressure, and movements of the piston 70 may be effected by controlling the drain and supply of low pressure fluid to the head end chamber 78 of the stabilizer cylinder through ports 72 and 46. The ports 46 connect with ports 56 in the valve sleeve 50, the ports 56 being connected to the low pressure fluid supply between the lands 81 and 82 of the valve piston 80 when the valve piston moves upwardly as viewed in Figure 3, and being connected to drain through passages 86 and 85 when the valve piston 80 moves downwardly, as viewed in Figure 3.

Referring particularly to Figures 4, 7 and 8, the means for varying the force of spring 94 on the lever 90 will next be described. It will be appreciated that inasmuch as the valve assembly is mounted in a centrifugal field, the piston 80 will assume a different position within the valve sleeve 50 for every different rotational speed of the regulator assembly 30 within which the valve assembly is mounted. Thus, with a given force of spring 94 acting on lever 90, the piston 80 will assume the onspeed position, as shown in Fig. 3, at a predetermined speed. Moreover, it will be appreciated that if the force of spring 94 is reduced, the rotational speed at which the piston 80 will assume the onspeed position will be correspondingly lower, and if the force of spring 94 is increased, the onspeed position of piston 80 will not be assumed thereby until the rotational speed is correspondingly increased. As is shown in Fig. 4, the servo piston 100 is disposed within a servo cylinder 101 formed within the valve housing 41. The piston 100 is formed somewhat similar to the stabilizer piston 70 in that it includes a working surface 102 and a ported surface 103. The cylinder 101 is provided with a single set of circumferentially spaced inlet ports 104, which are connected to a governor reset valve, not shown, in the manner shown in the aforementioned copending application, Serial No. 402,440. When pressure fluid is admitted to ports 104, the piston 100 will be moved downwardly, as viewed in Fig. 4, so as to increase the force of spring 94 on the lever 90, thus allowing a higher governing speed. Conversely, when the ports 104 are connected to drain, the thrust of centrifugal force acting on the piston 100 will move the piston 100 to the position shown in Fig. 4, where the force of spring 94 is at a minimum for any one selected spring force as determined by the mechanical adjustment set forth hereinafter. The force of spring 94 is varied to establish a cruise governing speed or a maximum control speed, as is more particularly set forth in the aforementioned copending application, Serial No. 402,440.

The force of spring 94 may be mechanically adjusted prior to installation of the governor valve assembly in the regulator assembly 30, but is more commonly adjusted after the governor is installed in the regulator assembly 30. Thus, the spring seat 95 is threadedly connected to an extension of the rod of piston 100. This extension 105 may be rotated so as to vary the position of spring seat 95, and after the adjustment has been made, the adjustment is maintained by the detent means disclosed in Figures 7 and 8. From an inspection of Figures 7 and 8, it may be seen that the rod 105 carries a serrated disc 106, which cooperates with a detent pin 107 that is maintained in engagement with the serrated disc 106 by means of a leaf spring 108. In order to effect the mechanical adjustment, the piston 100 is rotated by means of the slot 100a in its threaded end which engages nut 114, thus camming the detent pin 107 against the restraining force of spring 108.

As is seen in Figure 4, the relative axial position of piston 100 within the cylinder 101 may also be varied after the mechanical adjustment. The end of the piston rod 110 is provided with a longitudinally serrated portion 111, which is engaged by a ball detent 112 carried by a perforated annular spring 113. A nut 114, which threadedly engages the end of rod 110, may be rotated relative to the piston assembly 100 so as to effect a change in the longitudinal distance between nut 114 and stop 115, thus varying the amount the governing speed may be increased above that determined by the aforementioned mechanical adjustment.

In order to enable speed synchronization of all governors on a multi-engine aircraft installation, the governor valve assembly lever 90 is engaged by the movable roller 92. As is more particularly pointed out in the aforegoing copending application, the roller 92 is capable of limited linear movement in the directions of arrow 97, as shown in Fig. 4. Movement of the roller 92 varies the fulcrum point of the lever 90 and, thus, varies the effective force of spring 94 so as to vary the onspeed position of the centrifugal piston 80 independent of changes in the force of spring 94 by the servo piston 100.

*Operation*

The governor valve assembly operates in the following manner, presupposing that the propeller assembly is rotating initially at the preset governor speed. When the propeller is rotating onspeed, the centrifugal piston 80 assumes the position shown in Fig. 3, wherein fluid flow to the head end chamber 78 of the stabilizer cylinder is blocked by land 82, as is the drain therefrom, while the rod end chamber 77 is connected via ports 73 and 47 to the low pressure fluid from the pressure reducer valve. The substantially constant low pressure fluid is also available at ports 156, ports 45, ports 55 and the annular channel between piston lands 81 and 82. Inasmuch as the speed of propeller rotation determines the thrust of centrifugal force, and the piston 80 is responsive to the thrust of centrifugal force, an increase in propeller speed above the governor speed setting will cause the piston 80 to move upwardly, as viewed in Fig. 3. In so doing, land 82 will open ports 56 to the low pressure fluid from ports 55 so as to admit low pressure fluid through ports 46 and 72 to the head end chamber 78. Upward movement of piston 80 will also open ports 58 so as to admit low pressure fluid to ports 48, which, as is more fully disclosed in copending application, Serial No. 402,440, are connected to a blade angle actuator, not shown, and flow through the ports 58 effected by upward movement of the piston 80 is acceleration sensitive. Inasmuch as the head end of surface 75 is of greater area than the rod end thereof, the low pressure fluid in head end chamber 78 will effect upward movement of the piston 70, as viewed in Fig. 3. Upward movement of the piston 70 will cause the lever 60 to pivot in a counterclockwise direction about pin 61 so as to effect movement of the valve sleeve 50 in an upward direction so as to follow-up movement of the piston 80. When the sleeve 50 begins its upward movement, it will be observed that ports 49 in the porting sleeve 44 will be opened to ports 54 in the valve sleeve whereby low pressure fluid will be admitted to annular channel 43, which is also connected to the blade angle actuator, as shown in the aforementioned copending applications. Flow from port 55 through port 54 and port 49 to the channel 43 is proportional to the amount of speed error or speed sensitive. Accordingly, it will be observed that flow from the governor valve assembly to the blade angle actuator, not shown, is proportional to the amount of speed error and the rate of change of speed error.

When the sleeve 50 has completely followed-up movement of the piston 80, ports 58 will be closed so as to block acceleration sensitive flow to the blade angle actuator. At this time, propeller speed is no longer increasing and is beginning to decrease due to an increase in the pitch position of the blades. Therefore, the speed sensitive piston 80 will move downwardly, as viewed in Fig. 3, so as to connect ports 58 to drain, which flow is termed deceleration decrease flow. At the same time, ports 56 will be connected to drain through cross passage 86 and axial opening 85 and, thus, the head end chamber 78 of the stabilizer cylinder will be connected to drain to enable the valve sleeve 50 to follow the downward movement of the piston 80. When the onspeed position of the piston 80 is again attained, the sleeve will have moved to the position shown in Fig. 3, wherein both deceleration decrease flow to drain through ports 58, and overspeed increase flow through ports 49 to annular channel 43 will be blocked, and the propeller will be rotating at the selected speed.

If the propeller assembly should be rotating at a speed lower than that of the governor valve setting, the converse of the above would occur, namely, initially the governor valve piston 80 would establish deceleration decrease flow, then the sleeve would establish underspeed decrease flow, then deceleration decrease flow would stop and acceleration increase flow would begin and finally the valve piston and valve sleeve would return to their onspeed positions, as shown in Fig. 3.

From the foregoing, it is manifest that the present invention provides a valve assembly having relatively movable valve elements which function to provide fluid flow proportional to the amount of speed error and the rate of change of speed error. Moreover, the instant valve assembly includes means for varying the speed setting thereof. In addition, the governor valve assembly includes means for synchronizing its speed setting with other like governors.

While the embodiment of the present invention as herein disclosed, constitutes a preferred form, it is to be understood that other forms might be adopted.

What is claimed is as follows:

1. In a governor valve assembly, resilient means for establishing the speed setting of the governor valve assembly; a reciprocable seat engaging one end of the resilient means, a servo cylinder, a servo piston in said cylinder having a rod, said rod having threaded connection with said seat whereby reciprocation of said piston will reciprocate the seat to vary the stress of said resilient means, means engaging said rod for normally restraining rotation thereof, and manual means operable to rotate said piston and said rod by overcoming said rotation restraining means to vary the stress of said resilient means by effecting adjustment of said seat relative to the servo piston.

2. In a governor valve assembly, a spring for establishing the speed setting of the governor valve assembly, a reciprocable spring seat engaging one end of the spring, a servo cylinder, a servo piston in said cylinder having a rod, said rod having a threaded connection with said spring seat whereby reciprocation of said piston will reciprocate said seat to vary the stress of said spring, a disc attached to said rod having axially extending peripheral serrations, means engaging the peripheral serrations of said disc for normally restraining rotation of said rod, and manual means operable to rotate said piston and said rod by overcoming said rotation restraining means to vary the stress of said spring by effecting adjustment of said seat relative to the servo piston.

3. The combination set forth in claim 2 wherein said rotation restraining means comprises a pin engageable with the peripheral serrations of said disc and resilient means engaging said pin for maintaining said pin in engagement with said disc.

4. In a governor valve assembly, a spring for establishing the speed setting governor valve assembly, a reciprocable seat engaging one end of the spring, a servo cylinder, a servo piston in the cylinder having a rod extending in opposite directions, one end of said rod having a threaded connection with the spring seat whereby reciprocation of the piston will reciprocate the seat to vary the stress of said spring, a stop carried by the other end of said rod, and a nut threadedly engaging said other end of the rod engageable with the stop to limit the stroke of the servo piston, said nut being adjustable relative to the rod to vary the distance between the piston and the stop.

References Cited in the file of this patent

UNITED STATES PATENTS

| | | |
|---|---|---|
| 929,206 | Gelpke et al. | July 27, 1909 |
| 1,143,034 | Brown | June 15, 1915 |
| 1,512,804 | Roucka | Oct. 21, 1924 |
| 1,585,529 | Boving | May 18, 1926 |
| 2,018,977 | Spellman | Oct. 29, 1935 |
| 2,407,791 | Martin et al. | Sept. 17, 1946 |
| 2,458,398 | MacNeil | Jan. 4, 1949 |
| 2,470,099 | Hall | May 17, 1949 |
| 2,496,284 | Gillespie | Feb. 7, 1950 |
| 2,561,588 | Muzzey | July 24, 1951 |
| 2,570,287 | Taylor | Oct. 9, 1951 |
| 2,697,599 | Vandal | Dec. 21, 1954 |

FOREIGN PATENTS

| | | |
|---|---|---|
| 703,319 | Germany | Mar. 6, 1941 |
| 57,814 | Netherlands | July 15, 1946 |